(12) United States Patent
Nishida

(10) Patent No.: US 9,947,075 B2
(45) Date of Patent: Apr. 17, 2018

(54) IMAGE PROCESSING APPARATUS

(71) Applicant: KYOCERA Document Solutions Inc., Osaka (JP)

(72) Inventor: Atsushi Nishida, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/483,020

(22) Filed: Apr. 10, 2017

(65) Prior Publication Data
US 2017/0301056 A1   Oct. 19, 2017

(30) Foreign Application Priority Data

Apr. 13, 2016 (JP) .................................. 2016-080662

(51) Int. Cl.
G09G 5/36 (2006.01)
G06T 1/60 (2006.01)
G06T 1/00 (2006.01)

(52) U.S. Cl.
CPC .............. G06T 1/60 (2013.01); G06T 1/0007 (2013.01)

(58) Field of Classification Search
None
See application file for complete search history.

(56) References Cited

U.S. PATENT DOCUMENTS

| 8,411,094 | B2 * | 4/2013 | Falchetto | G06F 15/16 345/421 |
| 2006/0110050 | A1 * | 5/2006 | Aoyama | G06T 3/0018 382/232 |
| 2008/0198168 | A1 * | 8/2008 | Jiao | G06T 15/005 345/506 |
| 2015/0379666 | A1 * | 12/2015 | Redzic | G06T 1/20 345/646 |
| 2016/0042549 | A1 * | 2/2016 | Li | G06T 15/005 345/426 |

FOREIGN PATENT DOCUMENTS

JP        2000-20710       1/2000

* cited by examiner

*Primary Examiner* — Peter Hoang

(57) ABSTRACT

A data input circuit stores decoded image data into the line buffer. A transmission circuit transmits image data of a rear end part in the primary scanning direction of each line in the line buffer to a boundary buffer. In the secondary scanning direction, a second block is adjacent to a first block, and a fourth block is adjacent to a third block. The third block is adjacent to the first block in the primary scanning direction. The filter execution circuit continuously performs filter execution of: (a) the rear end part in the primary scanning direction of (a1) the rear end part in the secondary scanning direction of the first block and (a2) the second block, and (b) the rear end part in the secondary scanning direction of the third block and (c) the fourth block, using the image data stored in the boundary buffer and the line buffer.

4 Claims, 8 Drawing Sheets

IMAGE PROCESSING APPARATUS

CROSS-REFERENCE TO RELATED APPLICATIONS

This application relates to and claims priority rights from Japanese Patent Application No. 2016-080662, filed on Apr. 13, 2016, the entire disclosures of which are hereby incorporated by reference herein.

BACKGROUND

1. Field of the Present Disclosure

The present disclosure relates to an image processing apparatus.

2. Description of the Related Art

When filter execution of an image is performed for each of blocks into which the image is divided along a primary scanning direction and a secondary scanning direction, the filter execution is performed using not only image data of a block but image data of pixels adjacent to the block corresponding to a filter size thereof.

For example, in case of a filter size of 9 pixels by 9 lines, obtaining a filter execution result (i.e. a filter output) of a block of 128 pixels by 128 lines requires image data of 136 pixels by 136 lines.

If image data of an original image as a target of the filter process is stored in a DRAM (Dynamic Random Access Memory), a filter processing unit reads the image data using burst transmission from the DRAM and performs the filter execution. The burst transmission transmits fixed amount of data each time, and therefore, due to reading the image data of pixels adjacent to the block, many times of the burst transmission are required for the filter execution of the block. Consequently, a large bandwidth is consumed on a memory bus of the DRAM.

For example, in case that filter execution with a filter size of 9 pixels by 9 lines is performed for a block of 128 pixels by 128 lines in image data of 1 byte per pixel, if a read data amount in one time of the burst transmission of the DRAM is 64 bytes, then for one line, image data in the block can be read by only two times of the burst transmission, but three times of the burst transmission are required because the filter execution additionally requires image data of 4-pixel width adjacent pixels and consequently requires image data of 136 pixels in total.

SUMMARY

An image processing apparatus performing filter execution block by block, according to an aspect of the present disclosure includes a memory in which at least encoded image data is stored, a decoding circuit, a filter execution circuit, a first memory controller, a second memory controller, a line buffer in which image data can be stored of at least the number of lines of the filter size, a third memory controller, a data input circuit, a boundary buffer, and a transmission circuit. The decoding circuit is configured to decode the encoded image data. The filter execution circuit is configured to perform the filter execution with a predetermined filter size for the image data decoded by the decoding circuit. The first memory controller is configured to read the encoded image data of the block from the memory to the decoding circuit using burst transmission with a specific data amount. The second memory controller is configured to write the decoded image data of a rear end part in a secondary scanning direction of the block from the decoding circuit to the memory using burst transmission with the specific data amount. The third memory controller is configured to read the decoded image data of a previous block in the secondary scanning direction from the memory line by line using predetermined times of burst transmission with the specific data amount. The data input circuit is configured to store the decoded image data read by the third memory controller and the image data decoded by the decoding circuit in turn into the line buffer. The transmission circuit is configured to transmit image data of a rear end part in the primary scanning direction of each line in the line buffer to the boundary buffer.

The rear end part in the secondary scanning direction of the block to be written in the memory by the second memory controller includes at least lines less by one than the number of lines of the filter size in the secondary scanning direction. The rear end part in the primary scanning direction of the each line includes at least pixels less by one than the number of pixels of the filter size in the primary scanning direction.

For first, second, third and fourth blocks that the second block is adjacent to the first block in the secondary scanning direction, the fourth block is adjacent to the third block in the secondary scanning direction, and the third block is adjacent to the first block in the primary scanning direction, the filter execution circuit continuously performs the filter execution of: (a) the rear end part in the primary scanning direction of (a1) the rear end part in the secondary scanning direction of the first block and (a2) the second block, and (b) the rear end part in the secondary scanning direction of the third block and (c) the fourth block, using the image data stored in the boundary buffer and the image data stored in the line buffer.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
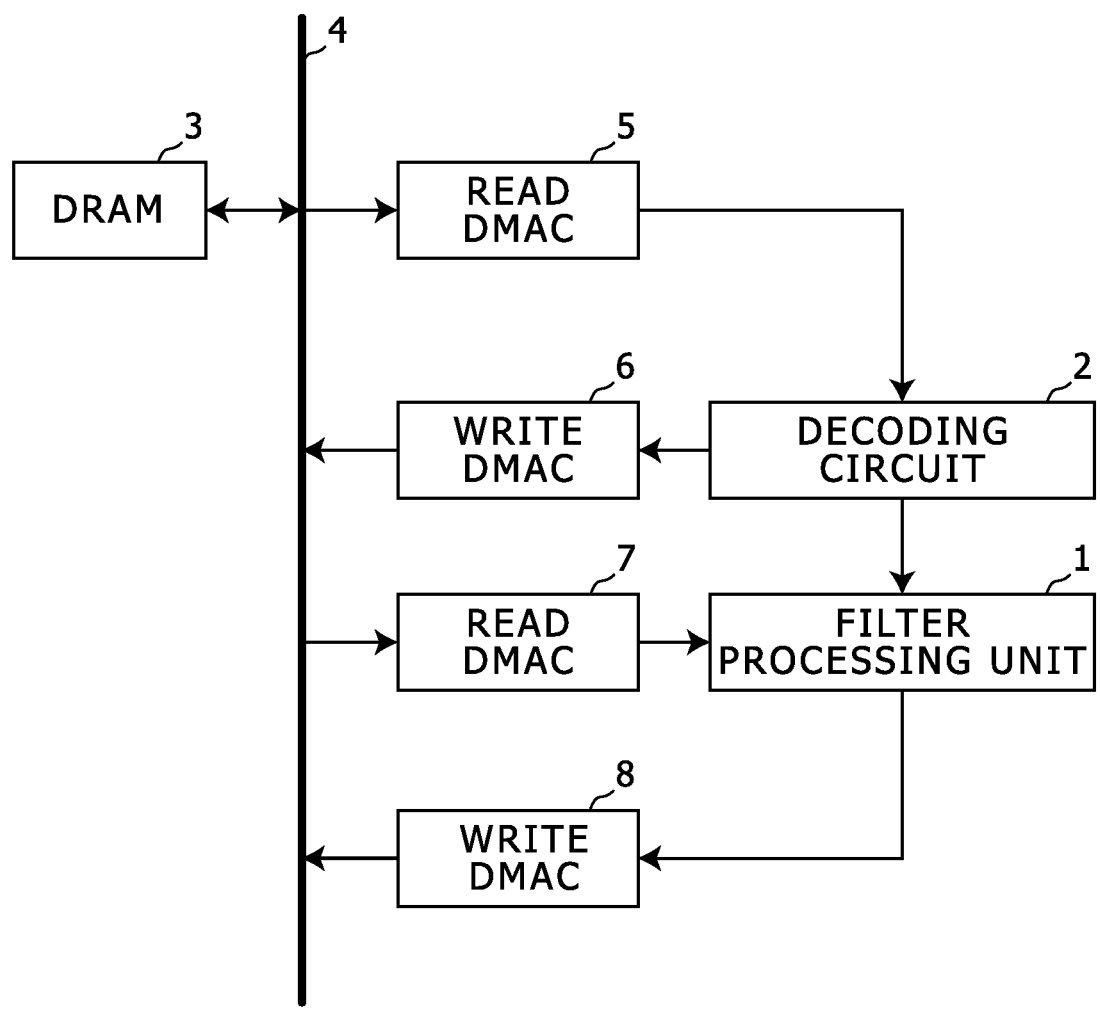
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. The image processing apparatus shown in FIG. 1 includes a filter processing unit 1, a decoding circuit 2, a DRAM 3, a memory bus 4, a read DMAC (Direct Memory Access Controller) 5, a write DMAC 6, a read DMAC 7, and a write DMAC 8. For example, the image processing apparatus shown in FIG. 1 is built in an image forming apparatus such as a printer or a multi function peripheral.

The filter processing unit 1 performs filter execution with a predetermined filter size block by block for image data decoded by the decoding circuit 2 (i.e. image data not encoded, namely laster image data).

The decoding circuit 2 decodes encoded image data block by block with a predetermined size (e.g. 128 pixels by 128 lines) along scanning directions. This image data is encoded in a predetermined manner such as JPEG (Joint Photographic Experts Group).

The DRAM 3 is a memory in which the encoded image data, a part of the decoded image data, and the image data for which the filter process has been performed are stored.

To the memory bus 4, the DRAM 3, the read DMACs 5 and 7, and the write DMACs 6 and 8 are connected.

The read DMACs 5 and 7 read data via the memory bus 4 from the DRAM 3. The write DMACs 6 and 8 write data via the memory bus 4 to the DRAM 3.

The read DMAC 5 is a first memory controller that reads the encoded image data of each block from the DRAM 3 to the decoding circuit 2 using burst transmission with a specific data amount.

The write DMAC 6 is a second memory controller that writes the decoded image data of a rear end part in a secondary scanning direction of a block from the decoding circuit 2 to the DRAM 3 using burst transmission with the specific data amount.

The rear end part in the secondary scanning direction of the block to be written in the DRAM 3 by the write DMAC 6 includes at least lines less by one than the number of lines of the filter size of the filter processing unit 1 in the secondary scanning direction.

The read DMAC 7 is a third memory controller that reads the decoded image data of a previous block in the secondary scanning direction from the DRAM 3 line by line using predetermined times of burst transmission with the specific data amount.

After being read by the read DMAC 7, the decoded image data in the DRAM 3 can be discarded, and therefore the write DMAC 6 may write the image data in the DRAM 3 so as to overwrite the image data that has been read by the read DMAC 7.

The write DMAC 8 is a fourth memory controller that writes the filter-processed image data from the filter processing unit 1 to the DRAM 3 using burst transmission with the specific data amount.

Figure 2:
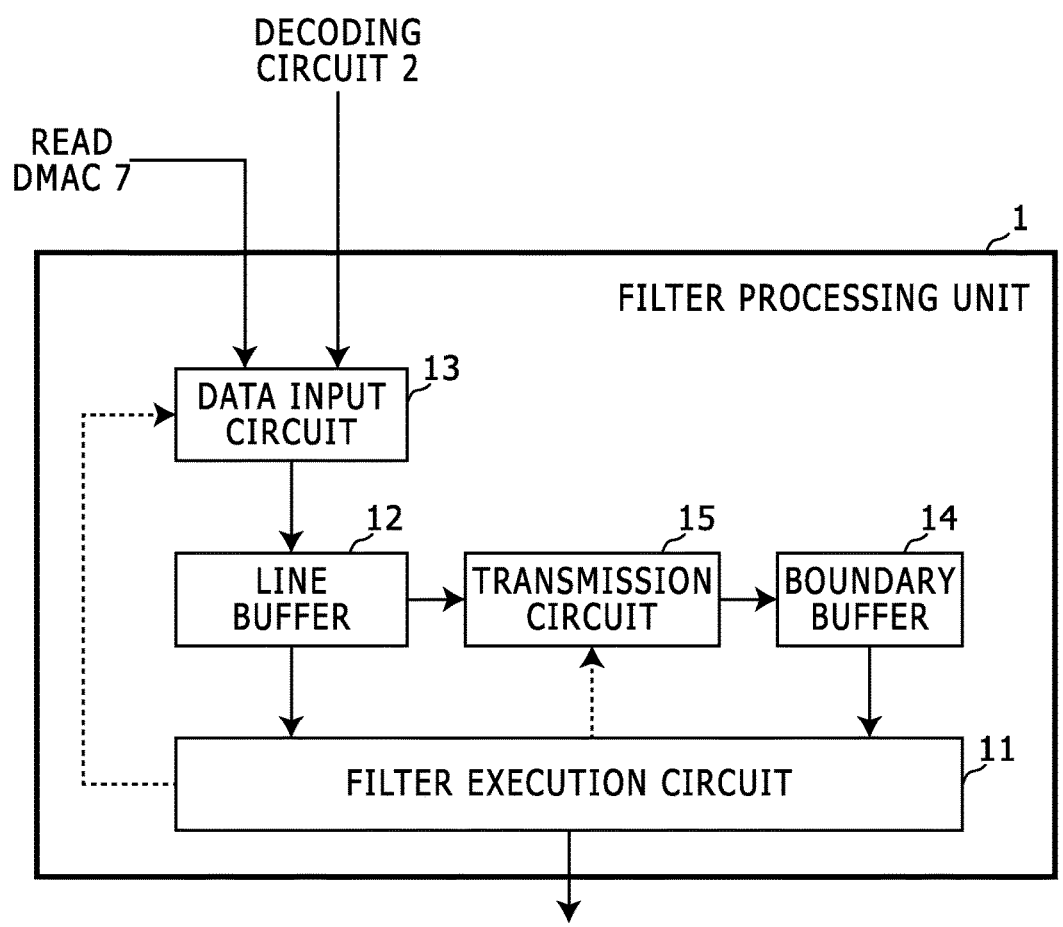
FIG. 2 shows a block diagram that indicates a configuration of the a filter processing unit 1 shown in FIG. 1.

FIG. 2 shows a block diagram that indicates a configuration of the filter processing unit 1 shown in FIG. 1.

The filter processing unit 1 shown in FIG. 2 includes a filter execution circuit 11, a line buffer 12, a data input circuit 13, a boundary buffer 14, and a transmission circuit 15.

The filter execution circuit 11 performs filter execution with a predetermined filter size for image processing. For example, in order to obtain a filter execution result of a target pixel, the filter execution circuit 11 performs filter execution with a predetermined filter size of 9 pixels by 9 lines of which a center is set at the target pixel.

Specifically, for first, second, third and fourth blocks that the second block is adjacent to the first block in the secondary scanning direction, the fourth block is adjacent to the third block in the secondary scanning direction, and the third block is adjacent to the first block in the primary scanning direction, the filter execution circuit 11 continuously performs the filter execution of: (a) the rear end part in the primary scanning direction of (a1) the rear end part in the secondary scanning direction of the first block and (a2) the second block, and (b) the rear end part in the secondary scanning direction of the third block and (c) the fourth block, using the image data stored in the boundary buffer 14 and the image data stored in the line buffer 12.

The line buffer 12 is a memory in which image data can be stored of at least the number of lines of the filter size. For example, an SRAM (Static RAM) is used as the line buffer 12. For example, if the filter size is 9 pixels by 9 lines, and the number of pixels in one line in a block is 128, then image data of 128 pixels by 9 lines can be stored in the line buffer 12.

The data input circuit 13 stores the decoded image data read by the read DMAC 7 (i.e. image data of a previous block in the secondary scanning direction) and the image data decoded by the decoding circuit 2 in turn into the line buffer 12.

The data input circuit 13 firstly stores the decoded image data read by the read DMAC 7 in turn into the line buffer 12, and subsequently stores the decoded image data decoded by the decoding circuit 2 in turn into the line buffer 12.

The boundary buffer 14 is a memory that temporarily keeps image data to be used for performing the filter execution together with a next block in the primary scanning direction, among image data read out to the line buffer 12. For example, an SRAM is used as the boundary buffer 14.

The transmission circuit 15 transmits image data of a rear end part in the primary scanning direction of each line in the line buffer 12 to the boundary buffer 14. This rear end part includes pixels of which at least the number is less by one than the number of pixels of the filter size in the primary scanning direction. Here this rear end part includes pixels of which the number is less by one than the number of pixels of the filter size in the primary scanning direction.

In this embodiment, when a line in the line buffer 12 becomes no longer required for the filter execution (i.e. when it becomes possible to overwrite this line with a next line), the transmission circuit 15 transmits image data of the rear end part in the primary scanning direction of this no longer required line to the boundary buffer 14.

It should be noted that the number of pixels in one line in a block is set so that (a) a data amount of the decoded image data of one line in the block is equal to or less than an amount obtained by multiplying the aforementioned specific data amount by a predetermined integer m and (b) a data amount of image data required for the filter execution of one line in the block is larger than an amount obtained by multiplying the aforementioned specific data amount by the aforementioned integer m. In addition, it is favorable that a data amount of the decoded image data of one line in the block is an integer multiple of the aforementioned specific data amount.

Figure 3:
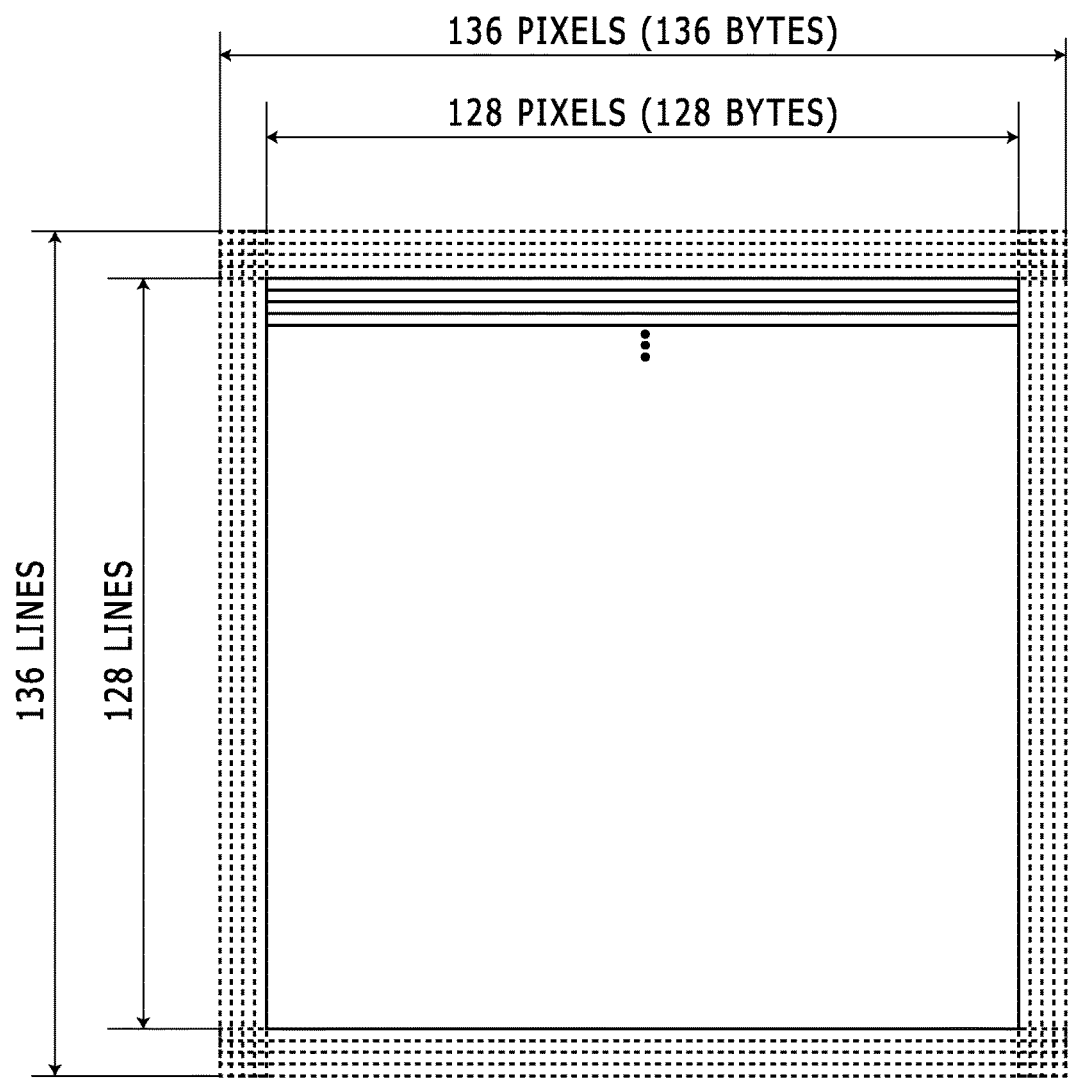
FIG. 3 shows a diagram that indicates an example of a block in an original image.

FIG. 3 shows a diagram that indicates an example of a block in an original image. For example, if one block is an area of 128 pixels by 128 lines as shown in FIG. 3 and the size of image data of one pixel is 1 byte, then a data amount of image data of one line is 128 bytes, that is, the double of 64 bytes as a data amount of the burst transmission. If the filter size of the filter execution circuit 11 is 9 pixels by 9 lines, then 4 lines adjacent to each of an upper side, a lower side, a front side, and a rear side of a block are additionally required to obtain a filter output of this one block. Thus, in this case, in order to obtain a filter output of one block, image data of 136 pixels by 136 lines are required.

Figure 4:
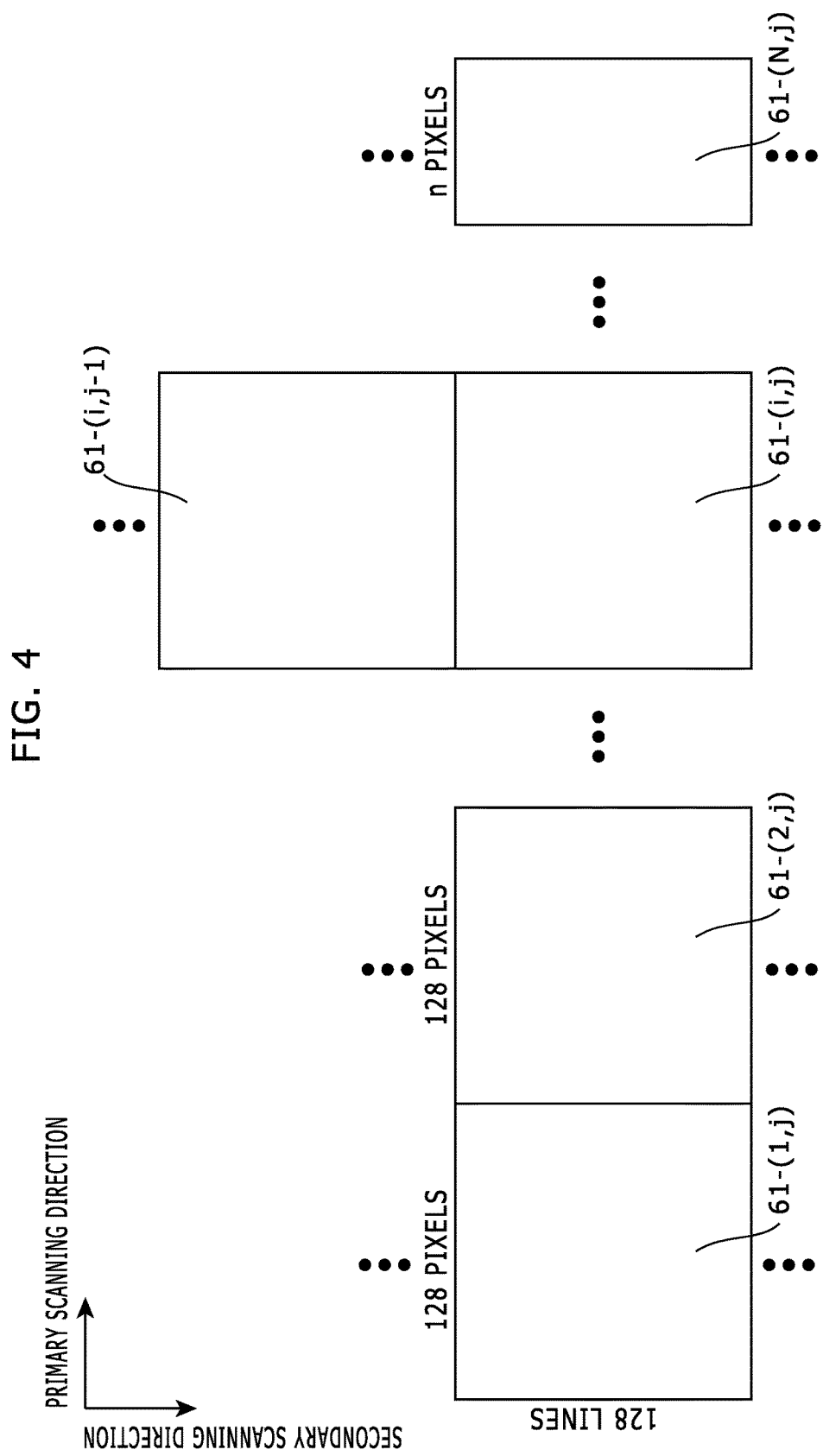
FIG. 4 shows a diagram that explains blocks arranged continuously along a primary scanning direction and a secondary scanning direction in the original image.
Figure 5:
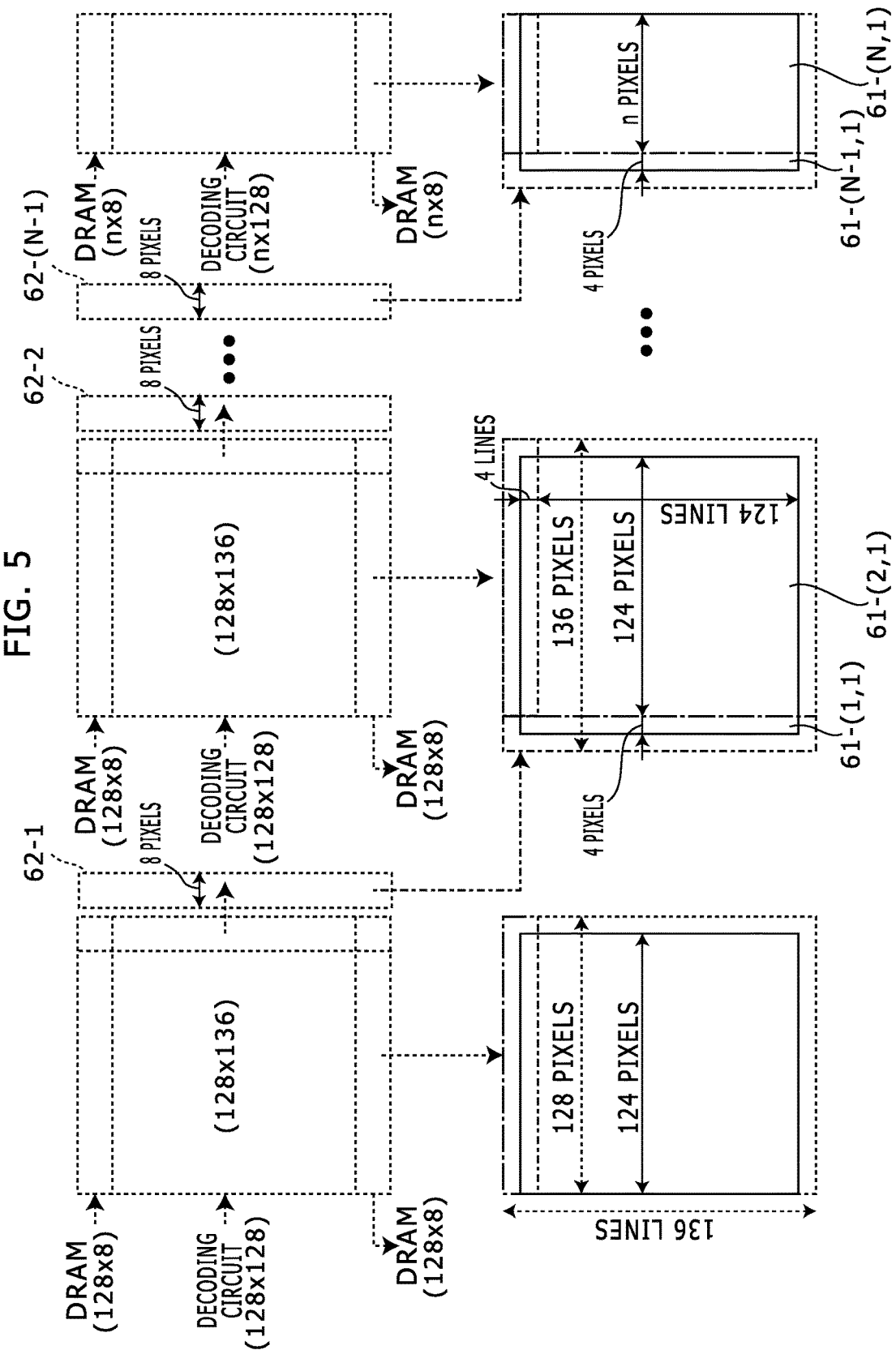
FIG. 5 shows a diagram that indicates a dataflow of each block shown in FIG. 4, in the filter processing unit 1 shown in FIG. 2.

FIG. 4 shows a diagram that explains blocks arranged continuously along a primary scanning direction and a secondary scanning direction in the original image. FIG. 5 shows a diagram that indicates a dataflow of each block shown in FIG. 4.

For example, as shown in FIG. 4, when blocks 61-($i$, 1), ..., 61-($i, j$–1), 61-($i, j$), ... of 128 pixels by 128 lines per block are arranged along the secondary scanning direction, upon finishing decoding image data of the block 61-($i, j$–1), the rear end part (128 pixels by 8 lines) of the block 61-($i, j$–1) is buffered in the DRAM 3 until the block 61-($i, j$) is set as a target block to be processed. Afterward, when the block 61-($i, j$) is set as a target block, the rear end part (128 pixels by 8 lines) of the block 61-($i, j$–1) is read from the DRAM 3, and the decoded image data (128 pixels by 128 lines) of the block 61-($i, j$) is read from the decoding circuit 2, and thereby for the block 61-($i, j$) as a target block, the image data of 128 pixels by 136 lines in total is prepared in the line buffer 12 in turn.

For example, as shown in FIG. 4, when blocks 61-(1, $j$), ..., 61-(N, j) of 128 pixels by 128 lines per block are arranged along the primary scanning direction, firstly, regarding the block 61-(1, $j$) as a head block in the primary scanning direction, 136 lines including adjacent 8 lines as shown in FIG. 3 (i.e. image data of 128 pixels by 136 lines) are read from the DRAM 3 and the decoding circuit 2 to the line buffer 12 part by part, and using 9 lines of 128 pixels per line in the line buffer 12 for obtaining a filter output of one line, for the 128 lines, filter outputs of 124 pixels per line are continuously obtained.

With this process, among the image data of 128 pixels by 136 lines read out to the line buffer 12 in turn, image data of a rear end part 62-1 (an area of 8 pixels by 136 lines) is transferred to the boundary buffer 14 in turn.

Regarding the next block 61-(2, $j$), 136 lines including adjacent 8 lines (of 128 pixels per line) are read from the DRAM 3 and the decoding circuit 2 to the line buffer 12 as well, and using 9 lines of 136 pixels per line in total of 8 pixels in the boundary buffer 14 and 128 pixels in the line buffer 12 for obtaining a filter output of one line, filter outputs of residual 4 pixels of the block 61-(1, $j$) and filter outputs of 124 pixels of the block 61-(2, $j$) for one line are continuously obtained.

With this process, among the image data of 128 pixels by 136 lines read out to the line buffer 12 in turn, image data of a rear end part 62-2 (an area of 8 pixels by 136 lines) is transferred to the boundary buffer 14 in turn. In this process, a line no longer required in the rear end part 62-1 is overwritten with a line of the rear end part 62-2 in turn.

Afterward, for each block 61-($i, j$) to the last block 61-(N, j), the same process is performed as well as the process for the block 61-(2, $j$). However, if the number of pixels in the primary scanning direction in the last block 61-(N, j) is not 124 pixels, then filter outputs of each line of the last block 61-(N, j) are obtained only for less than 128 pixels.

It should be noted that regarding a block including a side of the original image, for example, the filter execution can be performed while a pixel value of a pixel outside from the side is considered as zero.

Figure 6:
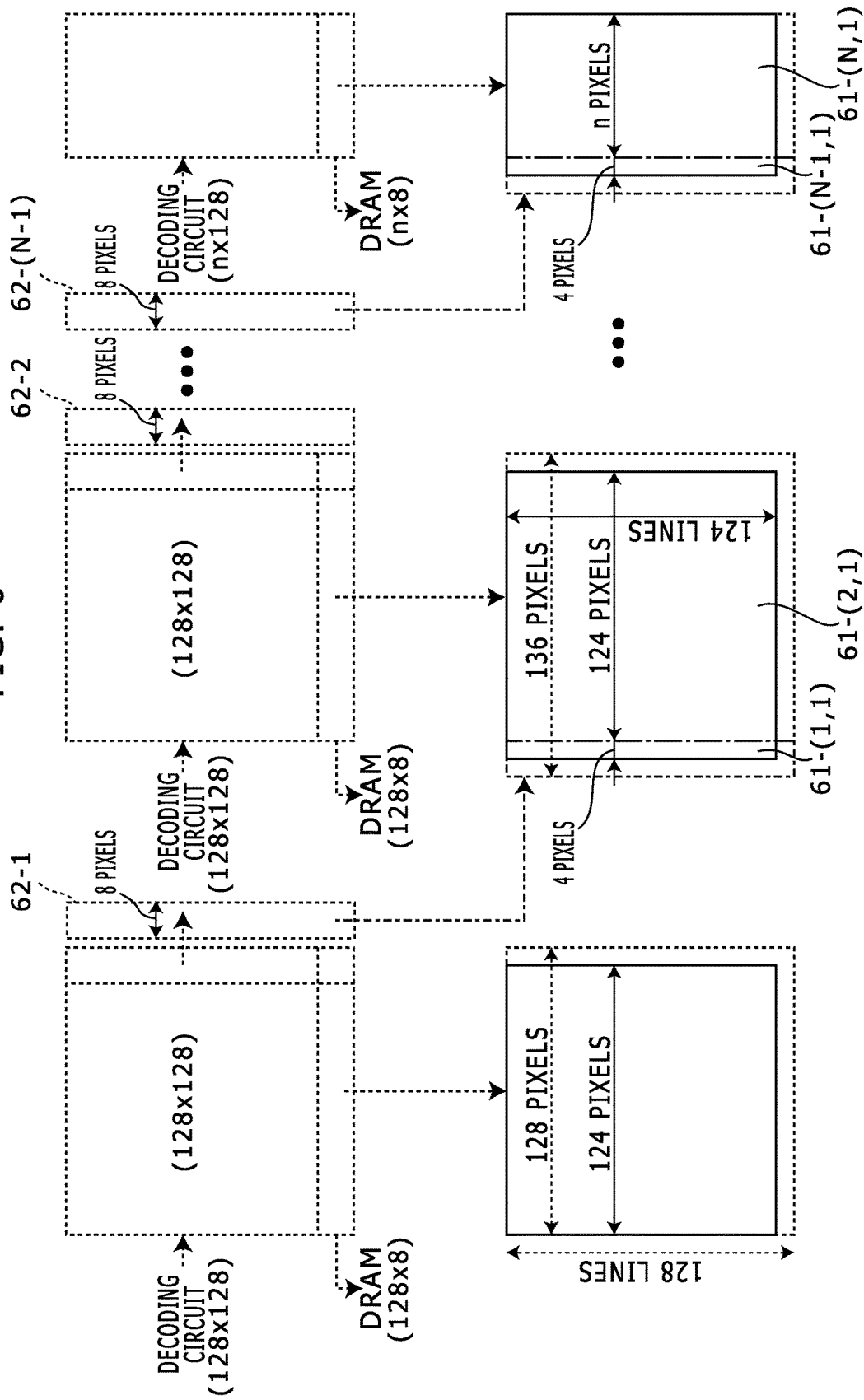
FIG. 6 shows a diagram that indicates a dataflow of a head block in the secondary scanning direction, in the filter processing unit 1 shown in FIG. 2.

FIG. 6 shows a diagram that indicates a dataflow of a head block 61-($i$, 1) in the secondary scanning direction, in the filter processing unit 1 shown in FIG. 2.

Regarding the head block 61-($i$, 1) in the secondary scanning direction, there are no image data to be read from the DRAM 3, and therefore, as shown in FIG. 6, the filter execution is performed for only decoded image data read from the decoding circuit 2.

The following part explains a behavior of the aforementioned image processing apparatus.

The decoding circuit 2 reads encoded image data using the read DMAC 5, selects a target block block by block in turn along the primary scanning direction and the secondary scanning direction from the head block 61-(1, 1) in the primary scanning direction and in the secondary scanning direction (in the aforementioned example, a block of 128 pixels by 128 lines), and decodes the encoded image data of the target block 61-($i, j$).

The decoded image data of each block 61-($i, j$) is read from the decoding circuit 2 to the filter processing unit 1, and a predetermined rear end part of a line in the decoded image data of each block 61-($i, j$) is written to a predetermined memory area in the DRAM 3 by the write DMAC 6.

For the head block 61-($i$, 1) in the secondary scanning direction, the filter processing unit 1 reads image data of a one-block amount from the decoding circuit 2 and the boundary buffer 14 as shown in FIG. 6, and continuously performs the filter execution (in the aforementioned example, the filter execution for 124 lines).

For a block other than the head blocks in the secondary scanning direction, the filter processing unit 1 causes the data input circuit 13 to read image data of a predetermined number of lines (i.e. image data of the rear end part in the secondary scanning direction of a previous block in the secondary scanning direction) from a predetermined memory area in the DRAM 3 using the read DMAC 7, and read image data of a one-block amount from the decoding circuit 2 and the boundary buffer 14, and continuously performs the filter execution (in the aforementioned example, the filter execution for 128 lines).

Thus, the filter execution is performed for (a) image data of the rear end part in the secondary scanning direction of a previous block in the secondary scanning direction of a target block, (b) image data of the rear end part in the primary scanning direction of a previous block in the primary scanning direction of the target block, and (c) decoded image data of the target block.

As mentioned, in an original image, the rear end part of the decoded image data of each block is buffered in a predetermined memory area in the DRAM 3, and used for the filter execution for a subsequent block in the secondary scanning direction.

Consequently, it is not required to start the filter execution after decoding image data of all blocks and storing the decoded image data of all blocks into a page memory or the like, and the decoding and the filter execution for one block are performed continuously.

Figure 7:
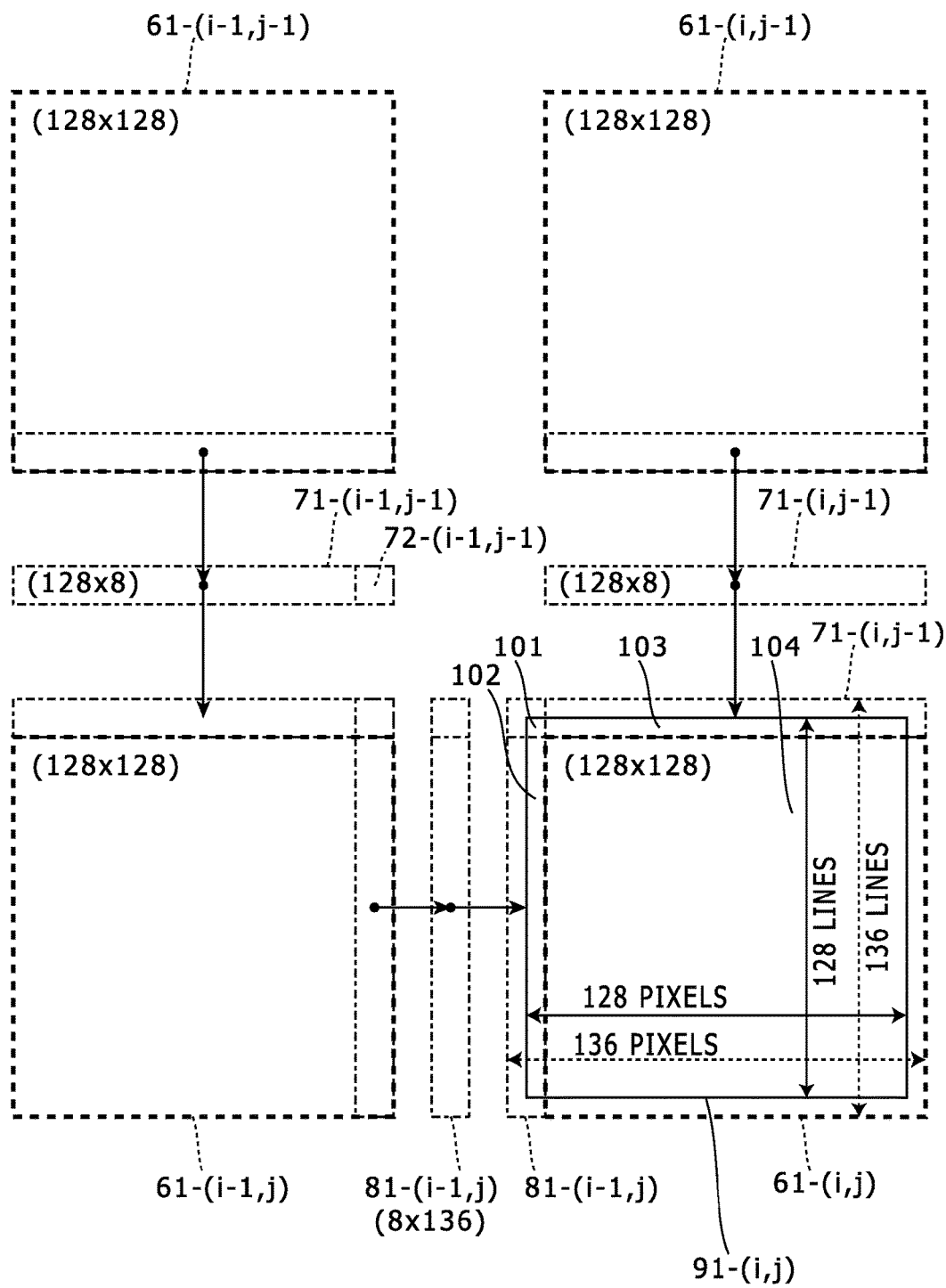
FIG. 7 shows a diagram that explains a relationship between a block of decoded image data and image data as a target of filter execution.

FIG. 7 shows a diagram that explains a relationship between a block of decoded image data and image data as a target of filter execution.

Specifically, as shown in FIG. 7, when the second block 61-($i$–1, $j$) is adjacent to the first block 61-($i$–1, $j$–1) in the secondary scanning direction and the fourth block 61-($i, j$) is adjacent to the third block 61-($i, j$–1) in the secondary scanning direction, and the third block 61-($i, j$–1) is adjacent to the first block 61-($i$–1, $j$–1) in the primary scanning direction, using the image data stored in the boundary buffer 14 and the image data stored in the line buffer 12, the filter execution circuit 11 continuously performs the filter execution of: (a) a rear end part 81-($i$–1, $j$) in the primary scanning direction of both (a1) a rear end part 71-(*i*–1, *j*–1) in the secondary scanning direction of the first block 61-(*i*–1, *j*–1) and (a2) the second block 61-(*i*–1, *j*), (b) a rear end part 71-(*i*, *j*–1) in the secondary scanning direction of the third block 61-(*i*, *j*–1), and (c) the fourth block 61-(*i*, *j*).

Here the rear end part 81-(*i*–1, *j*) in the primary scanning direction includes a rear end part 72-(*i*–1, *j*–1) in the primary scanning direction of the rear end part 71-(*i*–1, *j*–1) in the secondary scanning direction of the first block 61-(*i*–1, *j*–1).

The rear end parts 71-(*i*–1, *j*–1) and 71-(*i*, *j*–1) in the secondary scanning direction of the first block 61-(*i*–1, *j*–1) and the third block 61-(*i*, *j*–1) are buffered in the DRAM 3, and are timely read to the line buffer 12 and used. The rear end part 81-(*i*–1, *j*) in the primary scanning direction is buffered in the boundary buffer 14 and are timely read and used.

Thus, (a) the rear end part 81-(*i*–1, *j*) in the primary scanning direction of: the rear end part 71-(*i*–1, *j*–1) in the secondary scanning direction of the first block 61-(*i*–1, *j*–1) and the second block 61-(*i*–1, *j*), (b) the rear end part 71-(*i*, *j*–1) in the secondary scanning direction of the third block 61-(*i*, *j*–1), and (c) the fourth block 61-(*i*, *j*) forms image data of an area of 136 pixels by 136 lines, and enables the filter execution of an area 91-(*i*, *j*) of 128 pixels by 128 lines.

Consequently, a result of the filter execution is obtained of the area 91-(*i*, *j*) of 128 pixels by 128 lines shown in FIG. 7. The area 91-(*i*, *j*) includes areas 101, 102, 103 and 104. The area 101 is a part (4 pixels by 4 lines) of the first block 61-(*i*–1, *j*–1). The area 102 is a part (124 pixels by 4 lines) of the second block 61-(*i*–1, *j*). The area 103 is a part (4 pixels by 124 lines) of the third block 61-(*i*, *j*–1). The area 104 is a part (124 pixels by 124 lines) of the fourth block 61-(*i*, *j*).

The filter processing unit 1 writes image data of each block after the filter execution in the DRAM 3 using burst transmission with the specific data amount by the write DMAC 8.

As mentioned, a target block is selected block by block in turn along the scanning directions, and for each target block, the decoding and the filter execution are continuously performed.

Figure 8:
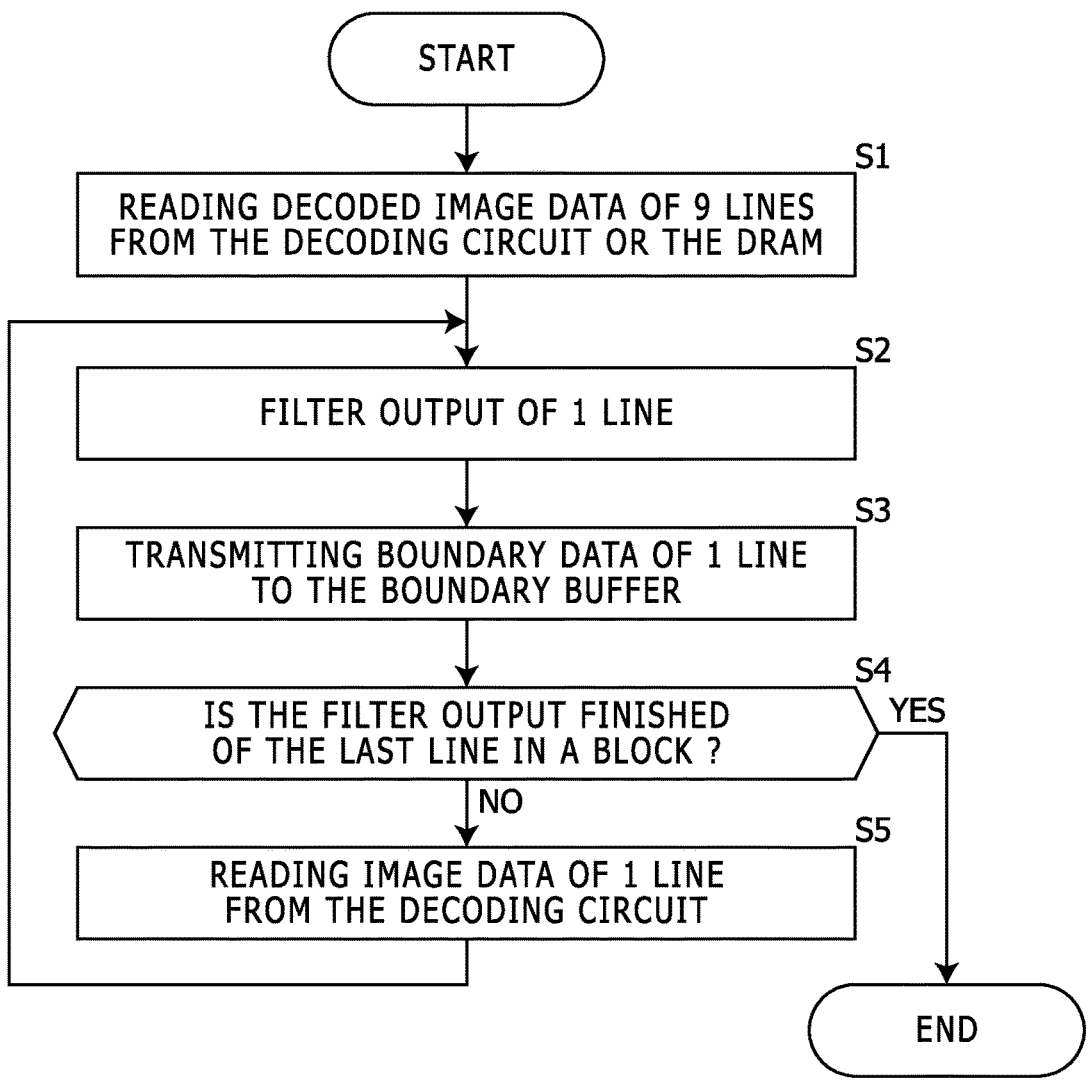
FIG. 8 shows a flowchart that explains a process for one block in the filter processing unit 1 shown in FIG. 2.

Here the process of the filter processing unit 1 is explained. FIG. 8 shows a flowchart that explains a process for one block in the filter processing unit 1 shown in FIG. 2.

Firstly, the data input circuit 13 reads image data of head 9 lines in 136 lines required for the filter execution of one block from the decoding circuit 2 or the DRAM 3 to the line buffer 12 (in Step S1).

Subsequently, the filter execution circuit 11 reads image data of pixels required for the filter execution (a) from the line buffer 12 or (b) from both the line buffer 12 and the boundary buffer 14 according to a position of a target pixel of which a filter output is executed, performs the filter execution using the read image data, and outputs its execution result as the filter output. The filter execution circuit 11 changes the target pixel pixel by pixel in one line and performs the filter execution of all pixels in the line (in Step S2).

When finishing the filter execution of all pixels in one line, according to an instruction from the filter execution circuit 11, the transmission circuit 15 reads image data of a rear end part (here 8 pixels) no longer used for the filter execution of subsequent lines to this line from the line buffer 12, and writes the read image data in the boundary buffer 14 (in Step S3).

Subsequently, the filter execution circuit 11 determines whether the filter output of the last line in the block has been done or not (in Step S4).

If the filter output of the last line in the block has not been done, then on the basis of an instruction from the filter execution circuit 11, the data input circuit 13 reads image data of subsequent one line (i.e. 128 pixels) from the decoding circuit 2 and overwrites an unnecessary line in the line buffer 12 with the read image data (in Step S5). Subsequently, returning to Step S2, the filter execution is performed to obtain a filter output of the subsequent line (in Step S2).

Otherwise, if the filter output of the last line in the block has been done, the filter execution circuit 11 determines that the filter output has been done of a one-block amount (i.e. a residual part of 4 pixels by 128 lines in the previous target block and a part of 124 pixels by 128 lines in the current target block), and therefore terminates the process for the one-block amount.

In such a manner, the process of a one-block amount is repeatedly performed for a residual part of a previous block and a part of a current block in a block row along the primary scanning direction. Finally when finishing the process for the last block in the primary scanning direction, the same process is performed for a next block row adjacent in the secondary scanning direction.

In the aforementioned embodiment, the decoding circuit 2 decodes encoded image data. The filter execution circuit performs filter execution with a predetermined filter size for the image data decoded by the decoding circuit 2.

The read DMAC 5 reads the encoded image data of each block from the DRAM 3 to the decoding circuit 2 using burst transmission with a specific data amount. The write DMAC 6 writes the decoded image data of a rear end part in a secondary scanning direction in a block from the decoding circuit 2 to the DRAM 3 using burst transmission with the specific data amount. The read DMAC 7 reads the decoded image data of a previous block in the secondary scanning direction from the DRAM 3 line by line using predetermined times of burst transmission with the specific data amount.

The data input circuit 13 stores the decoded image data read by the read DMAC 7 and the image data decoded by the decoding circuit 2 in turn into the line buffer 12. The transmission circuit 15 transmits image data of a rear end part in the primary scanning direction in each line of the line buffer 12 to the boundary buffer 14.

The rear end part in the secondary scanning direction of the block to be written in the DRAM 3 by the write DMAC 6 includes at least lines less by one than the number of lines of the filter size of the filter processing unit 1 in the secondary scanning direction. The rear end part in the primary scanning direction of the each line includes at least pixels less by one than the number of pixels of the filter size in the primary scanning direction.

For first, second, third and fourth blocks that the second block is adjacent to the first block in the secondary scanning direction, the fourth block is adjacent to the third block in the secondary scanning direction, and the third block is adjacent to the first block in the primary scanning direction, the filter execution circuit 11 continuously performs the filter execution of: (a) the rear end part in the primary scanning direction of (a1) the rear end part in the secondary scanning direction of the first block and (a2) the second block, and (b) the rear end part in the secondary scanning direction of the third block and the fourth block, using the image data stored in the boundary buffer 14 and the image data stored in the line buffer 12.

Consequently, the number of times of the burst transmission is restrained to be low and the filter execution is performed without using a large bandwidth of the memory bus 4.

Further, in the aforementioned embodiment, among the decoded image data, a part used for the filter execution for the next block adjacent in the secondary scanning direction is buffered in the DRAM 3.

Consequently, it is not required to start the filter execution after decoding image data of all blocks and storing the decoded image data in a page memory or the like, and thus, the decoding and the filter execution are continuously performed block by block.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, the block size, the filter size and the like in the aforementioned embodiment are examples and not limited to the aforementioned numerical values.

What is claimed is:

1. An image processing apparatus performing filter execution block by block, comprising:
   a memory in which at least encoded image data is stored;
   a decoding circuit configured to decode the encoded image data;
   a filter execution circuit configured to perform the filter execution with a predetermined filter size for the image data decoded by the decoding circuit;
   a first memory controller configured to read the encoded image data of the block from the memory to the decoding circuit using burst transmission with a specific data amount;
   a second memory controller configured to write the decoded image data of a rear end part in a secondary scanning direction of the block from the decoding circuit to the memory using burst transmission with the specific data amount;
   a line buffer in which image data can be stored of at least the number of lines of the filter size;
   a third memory controller configured to read the decoded image data of a previous block in the secondary scanning direction from the memory line by line using predetermined times of burst transmission with the specific data amount;
   a data input circuit configured to store the decoded image data read by the third memory controller and the image data decoded by the decoding circuit in turn into the line buffer;
   a boundary buffer; and
   a transmission circuit configured to transmit image data of a rear end part in the primary scanning direction of each line in the line buffer to the boundary buffer;
   wherein the rear end part in the secondary scanning direction of the block to be written in the memory by the second memory controller includes at least lines less by one than the number of lines of the filter size in the secondary scanning direction;
   the rear end part in the primary scanning direction of the each line includes at least pixels less by one than the number of pixels of the filter size in the primary scanning direction; and
   for first, second, third and fourth blocks that the second block is adjacent to the first block in the secondary scanning direction, the fourth block is adjacent to the third block in the secondary scanning direction, and the third block is adjacent to the first block in the primary scanning direction, the filter execution circuit continuously performs the filter execution of: (a) the rear end part in the primary scanning direction of (a1) the rear end part in the secondary scanning direction of the first block and (a2) the second block, and (b) the rear end part in the secondary scanning direction of the third block and (c) the fourth block, using the image data stored in the boundary buffer and the image data stored in the line buffer.

2. The image processing apparatus according to claim 1 wherein (a) a data amount of the decoded image data of one line in the block is less than an amount obtained by multiplying the specific data amount by a predetermined integer m, and (b) a data amount of image data required for the filter execution of one line in the block is larger than an amount obtained by multiplying the specific data amount by the integer m.

3. The image processing apparatus according to claim 2 wherein a data amount of the decoded image data of one line in the block is an integer multiple of the specific data amount.

4. The image processing apparatus according to claim 1 wherein when a line in the line buffer becomes no longer required for the filter execution, the transmission circuit transmits image data of the rear end part in the primary scanning direction of the no longer required line to the boundary buffer.

* * * * *